April 1, 1941.  O. C. SURFACE  2,236,926
DOWEL
Filed Feb. 17, 1938
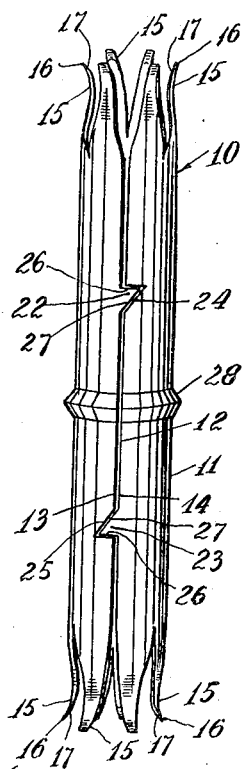
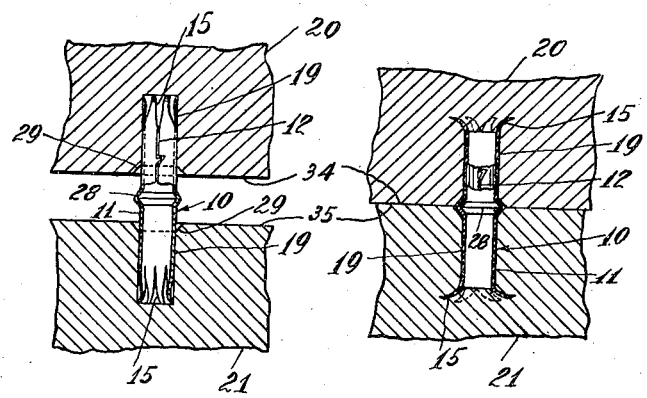
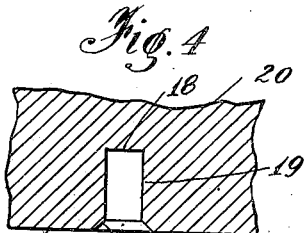
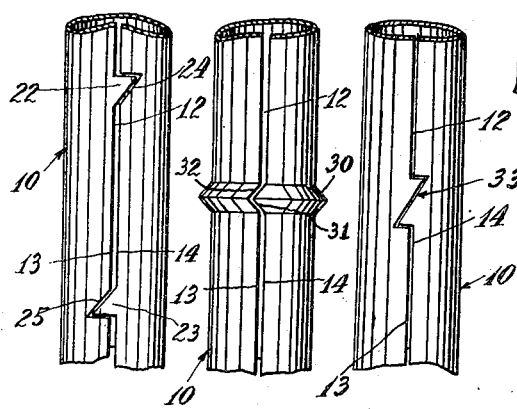
Ohlen C. Surface,
INVENTOR.
BY Ralph Douath
ATTORNEY.

Patented Apr. 1, 1941

2,236,926

UNITED STATES PATENT OFFICE 2,236,926

DOWEL

Ohlen C. Surface, Fenwick, W. Va.

Application February 17, 1938, Serial No. 190,893

4 Claims. (Cl. 20—94)

It is the purpose of this invention to provide a very firm and permanent fastening by means of which two pieces of wood or similar material may be quickly and readily united merely by pressing the pieces together.

One of the objects of this invention is to provide a tubular dowel which is formed of sheet metal having a plurality of longitudinally extending prongs or tines projecting from its ends, which prongs are adapted to clinch or secure itself in the wood when driven into initial position.

Many attempts have been made to produce a tubular dowel which is formed of sheet metal having prongs at each end, which prongs are spread outwardly when the dowel is driven home, whereby two pieces of wood may be joined together. Nearly all such dowels use expanding or spreading elements in addition to the dowel, which elements are inserted in previously prepared bores in the adjacent portions of the pieces of wood which receive the dowel. These spreading elements considerably increase the cost of manufacture, moreover, the inconvenience of handling additional parts (two spreaders) is considered a great disadvantage.

I am aware, that tubular and longitudinally split dowels that are provided with outwardly spreadable prongs at each end thereof are not new, but I have found that such a dowel has often the tendency, when driven home, to be longitudinally distorted. Such distortion might occur, for instance, when one of the prongs of the dowel strikes a hard spot or knot of the wood.

It is therefore another object of this invention to provide a tubular and longitudinally split dowel with means whereby the edges of the split are interlocked so as to prevent longitudinal distortion of the dowel when driven home.

Another object of the invention is to provide a tubular and longitudinally split dowel with means formed integral with the edges of the slit to prevent longitudinal distortion of the dowel when driven home.

A still further object of the invention is to provide a tubular dowel formed of a single piece of sheet metal which does not require separate so-called spreaders.

A further object of the invention is to produce a simple and inexpensive dowel that is well adapted for mass production, efficient in its use and which may be readily applied to join various portions of furniture or other articles with a minimum of time and labor.

In the accomplishment of these and such other objects as may hereafter appear the invention consists of the novel construction, combination and arrangement of parts herein specifically described and illustrated in the accompanying drawing, wherein are shown embodiments of the invention, but it is to be understood that changes, variations and modifications may be resorted to which come within the scope of the claims hereunto appended.

In the drawing wherein like numerals of reference designate corresponding parts throughout the several views, Figure 1 is a perspective view of one form of dowel in accordance with the present invention.

Figure 2 is a sectional view illustrating a dowel inserted in the opposite bores of two pieces of material to be joined together, and prior to being pressed in initial position.

Figure 3 is a view similar to Figure 2 with the two pieces of material securely united by a dowel.

Figure 4 is a sectional view of two pieces of material showing the prepared bores and counterbores for a dowel as illustrated in Figures 1, 2, 3 and 6.

Figure 5 is a fragmentary outline view of a modified form of a dowel in which the outwardly extending circular groove, as best shown in Figure 1, is eliminated.

Figure 6 is a fragmentary outline view of another modification of a dowel in which the outwardly extending transverse circular groove also serves as an interlocking medium to prevent longitudinal distortion of the dowel when driven home.

Figure 7 is a fragmentary outline view of another modification of another form of interlocking medium.

Proceeding now to the description of the drawing and referring particularly to Figures 1, 2, 3 and 4 inclusive, in which the dowel of one embodiment is illustrated in detail, the numeral 10 designates in general a dowel preferably formed of a single piece of sheet material and includes a tubular body portion 11, longitudinally slit at 12. The edges 13 and 14 of said slit 12 may be slightly spaced apart, as shown; however, they may be in abutment, if so desired.

At this time it is important to mention, that it is one of the paramount objects of this invention to produce a dowel which is made, for reason of economy, of sheet metal and not of tubular material since tubular material would defeat the purpose of this invention, namely, to produce an inexpensive dowel capable of meeting the selling cost of the wooden dowels now in use.

Continuing with the description, the said body portion 11 of dowel 10 is provided with a series of tines or prongs 15 at both ends, which prongs are tapered and curved inwardly and thence outwardly so that the extreme ends are outwardly flared as indicated by the numeral 16. The extremities of said prongs 15 are beveled on their inner faces as indicated at 17 so as to provide sharp edges to facilitate easy penetrating of the prongs in the material. Any number of prongs may be employed but they should be evenly distributed about the periphery of the body portion 11.

By shaping and arranging the prongs 15 in the form shown and above described, it will be obvious that said prongs upon reaching the base 18 of the bores 19 will spread outwardly in radial formation without the use of spreaders and penetrate both pieces 20 and 21 accordingly as best shown in Figure 3, whereby said pieces 20 and 21 are securely clinched together in a manner to prevent possibility of their becoming accidentally separated or disarranged.

As previously noted, longitudinally slit dowels of the character so far described have a tendency of being longitudinally distorted or displaced due to uneven strains against the prongs which strike a knot or a hard spot of the material when forcing the pieces to be joined together.

This disadvantage may be fully overcome by providing the dowel 10 with a pair of oppositely arranged angular extensions 22 and 23, preferably integral with the edges 13 and 14 respectively. These angular extensions interfit in corresponding angular recesses 24 and 25 along said edges 13 and 14 respectively.

Referring to Figure 1 of the drawing, the said extensions 22 and 23 of dowel 10 are employed and arranged to resist longitudinal distortion or displacement strain from either end of the dowel and for that reason edge 26 of said extensions facing one of said ends extends outwardly from edge 13—14 at an angle of ninety degrees whereas edge 27 is biased and joins edge 13—14 in a manner as shown.

The body portion 11 is also provided with an outwardly bulged transverse circular enlargement 28, positioned about midways of the dowel, which enlargement, when in final place, is encased between the counterbores 29 of pieces 20 and 21.

This construction is advantageous in certain cases, for instance, where the material of one piece is harder than the other piece to be joined thereto by a dowel, such arrangement would obviate the possibility of the dowel going in the softer wood or piece too far and in the harder piece insufficient to be properly clinched.

In Figure 5 a modification of the dowel is shown in which the transverse circular enlargement is eliminated.

Figure 6 shows another modified form of the interlocking means to prevent longitudinal distortion of a dowel. In this embodiment I show a transverse circular and outwardly extending V shaped shoulder 30, which shoulder includes a substantially V shaped tongue 31 formed integral therewith. This tongue cooperates with a V shaped groove 32, as shown. This construction not only provides an effective means whereby the distance of penetration of the dowel in each piece to be joined is equalized, but it also provides a very efficient means to prevent longitudinal distortion of the dowel when the pieces to be joined have been urged together.

Figure 7 shows another modification in which the dowel is provided with a Z shaped locking means 33 to prevent longitudinal distortion of a slitted dowel when driven home.

In applying the dowel 10 to the pieces 20 and 21 the pronged ends of the dowel are first inserted in the prepared holes or bores 19, the pieces 20 and 21 are then urged toward each other to bring their adjacent edges 34 and 35 into contact, as in Figure 3. As the pieces 20 and 21 are pressed together the prongs 15 will penetrate these respective pieces in a manner to spread outwardly in radial formation and clinch and permanently fasten said pieces together.

To better illustrate the advantage of the present invention there is shown in Figure 8 a tubular dowel produced from a single piece of sheet metal with plain longitudinal edges as it strikes a knot or hard spot in one of the pieces of wood thereby causing the dowel to be distorted. Extensive experiments have shown that dowels made from tubular material can not be as easily transversely and bodily distorted as tubular dowels made from sheet material with open longitudinal edges.

It is for this reason that tubular dowels made from sheet material should have provision to prevent such distortions. This has been fully accomplished by providing the opposing longitudinal edges of the dowel with integral inter-engaging detents which will only slightly increase the cost of production.

The various modifications of the invention are shown to give an indication of some of the many embodiments which the invention may assume, without departing from the spirit of the invention.

From the foregoing description, taken in connection with the drawing, it will be seen that the invention provided a novel dowel which is designed to carry out the objects of the invention in a reliable and efficient manner.

I claim:

1. A metal dowel comprising a tube open at both ends, a longitudinal slit extending the full length of the tube, said tube having its end portions formed with integral prongs extending longitudinally of the tube and tapered toward their outer ends, free ends of the prongs being curved outwardly to provide flared ends, the body portion of the tube at one side of the slit being formed with a recess having a sloping side edge extending diagonally of the tube and an abrupt edge extending circumferentially of the tube, and a locking tongue for preventing longitudinal distortion of the tubular dowel extending circumferentially of the tube from the portion of the tube at the other side of the slit into said recess and having a diagonally extending edge confronting the diagonal edge of the recess and an abrupt front edge confronting the abrupt edge of the recess for engagement therewith to brace the tube against longitudinal distortion.

2. A metal dowel comprising a tube open at both ends and formed with a slit extending the full length of the tube, said tube having its end portions formed with longitudinally extending anchoring prongs, the body of the tube at one side edge of the slit being formed with a recess disposed intermediate the length of the tube, and a tongue extending circumferentially of the body of the other side of the blank in position to engage in the recess and constitute locking means to prevent longitudinal distortion of the tubular dowel when the dowel is subjected to longitudinal strain.

3. A metal dowel comprising a tube open at both ends and formed with a slit extending the full length of the tube, said tube having its end portions formed with longitudinally extending anchoring prongs, a portion of the body of the tube at one side of the slit being formed with a recess spaced from one end of the tube and a portion of the body of the tube at the other side of the slit being formed with a recess spaced from the other end of the tube, and tongues extending from the body of the tube at opposite sides of the slit in opposite directions circumferentially of the tube in position to engage in the recess and constituting locking means to prevent longitudinal distortion of the tubular dowel when the dowel is subjected to longitudinal strain.

4. A metal dowel comprising a tube open at both ends and formed from a sheet metal blank having its side edges in close proximity to each other to form a slit extending the full length of the tube, said tube having its end portions formed with longitudinally extending anchoring prongs, said blank having its side edges provided with recesses and companion tongues for engaging in the recesses and serving as locking means to prevent longitudinal distortion of the tubular dowel when the dowel is subjected to longitudinal strain.

OHLEN C. SURFACE.